US006949318B2

(12) United States Patent
Choi et al.

(10) Patent No.: US 6,949,318 B2
(45) Date of Patent: Sep. 27, 2005

(54) POLYMERIC GEL ELECTROLYTE AND LITHIUM BATTERY EMPLOYING THE SAME

(75) Inventors: Young-min Choi, Daejeon (KR); Byoung-hyun Kang, Cheonan (KR); Jin-kyoung Kim, Cheonan (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 367 days.

(21) Appl. No.: 10/131,521

(22) Filed: Apr. 25, 2002

(65) Prior Publication Data

US 2002/0160269 A1 Oct. 31, 2002

(30) Foreign Application Priority Data

Apr. 26, 2001 (KR) ......................................... 2001-22674
Feb. 15, 2002 (KR) ......................................... 2002-8116

(51) Int. Cl.[7] .............................................. H01M 10/40
(52) U.S. Cl. ....................................... 429/303; 429/309
(58) Field of Search ................................. 429/303, 304, 429/309

(56) References Cited

U.S. PATENT DOCUMENTS

| 5,681,357 A | 10/1997 | Eschbach et al. |
| 6,051,342 A | 4/2000 | Hamano et al. |
| 6,537,705 B1 | 3/2003 | Hamano et al. |

FOREIGN PATENT DOCUMENTS

| EP | 1 001 476 | 5/2000 |
| JP | 6-163078 | * 6/1994 |
| JP | 10-162802 | 6/1998 |
| JP | 10-177865 | 6/1998 |
| JP | 11-312535 | 11/1999 |
| WO | WO 99/33136 | 7/1999 |

* cited by examiner

Primary Examiner—Jonathan Crepeau
(74) Attorney, Agent, or Firm—Lee & Morse, P.C.

(57) ABSTRACT

A polymeric gel electrolyte and a lithium battery employing the same are disclosed. The polymeric gel electrolyte includes a first ionic conductive polymer having a weight-average molecular weight of greater than or equal to 5,000 and smaller than 100,000, a second ionic conductive polymer having a weight-average molecular weight of 100,000 to 5,000,000, and an electrolytic solution that includes a lithium salt and an organic solvent. The first ionic conductive polymer preferably is at least one polymer selected from polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, and the second ionic conductive polymer preferably is at least one polymer selected from polyvinylidenefluoride, polyvinylidenefluoride-hexafluoropropylene copolymer, polyurethane, polyethylene oxide, polyacrylonitrile, polymethylmethacrylate, polyacrylamide, polyacetate, and mixtures and combinations thereof.

20 Claims, 4 Drawing Sheets

POLYMERIC GEL ELECTROLYTE AND LITHIUM BATTERY EMPLOYING THE SAME

BACKGROUND OF THE INVENTION

1. Field of the Invention

The present invention relates to a polymeric gel electrolyte and to a lithium battery employing the polymeric gel electrolyte. More particularly, the invention relates to a polymeric gel electrolyte having a good capability of impregnating an electrolytic solution, having good mechanical properties and ionic conductivity characteristics, and having improved adhesion to electrodes. The lithium battery of the invention that utilizes the polymeric gel electrolyte has improved charging/discharging characteristics and efficiency, and has long lasting life and shelf characteristics.

2. Description of the Related Art

Secondary batteries have increasingly become essential components of various portable electronic devices and telecommunications equipment, such as portable audio devices, cellular phones, camcorders, notebook type computers, and the like. The main bodies of such devices and equipment are becoming smaller and smaller, and the size of the secondary batteries has an impact on how small these devices can become. One factor to consider in the manufacture and sales of portable telecommunications equipment is the possibility of long lasting use of such devices and equipment. In particular, lithium polymer batteries are thin and light, just like paper, and have considerable flexibility with respect to their shape. Lithium polymer batteries employing polymer electrolyte also tend to be free from danger of leakage or explosion, and exhibit improved safety, unlike lithium ion batteries using liquid electrolytes. However, the lithium polymer batteries have a lower discharge capacity, and the manufacturing process thereof is complicated, when compared to the lithium ion batteries. In addition, it is expensive to manufacture these lithium polymer batteries.

Artisans today therefore have conducted various types of research into making and using polymer electrolytes, mostly the gel type, that have desirable conductivity characteristics at room temperature. The polymeric gel electrolytes usually are prepared by adding a large amount of liquid electrolyte into a polymer matrix. These polymeric gel electrolytes are known to substantially contribute to the practicability of lithium polymer batteries.

In the above-described gel polymeric electrolytes, the polymer matrixforming polymers that typically are used include polyacrylonitrile, polyvinylidenefluoride, polyethyleneoxide, polymethylmethacrylate and polyvinylchloride. These polymeric gel electrolytes have encountered, however, the following disadvantages when used in lithium polymer batteries.

Adding a large amount of an organic electrolytic solution to a polymer matrix may provide polymeric electrolytes having poor physical properties, (e.g., causing internal shorting). Large amounts of organic electrolyte solutions also may increase the thickness of the resulting film used to form the battery, sharply deteriorating the battery performance during charging/discharging, which also may deteriorate the battery performance at a high current rate. In addition, since the organic electrolytic solution typically is highly volatile, it is difficult to accurately adjust the content of the electrolytic solution during the course of preparing the polymeric gel electrolyte. The foregoing disadvantages are even more problematic when the electrolytic solution is not uniformly distributed in the battery or the content of the electrolytic solution is not adjusted accurately, because nonuniformity in current flow may occur during charging/discharging of the battery, thereby resulting in deterioration in battery performance.

To overcome the foregoing disadvantages, i.e., improve physical properties of polymeric electrolytes, the art has proposed a method in which a porous film is used as a support body of a polymeric gel electrolyte. For example, U.S. Pat. No. 5,681,357, the disclosure of which is incorporated by reference herein in its entirety, discloses a lithium secondary battery prepared by forming a cell by coating a porous polyethylene film with a polyvinylidenefluoride solution and drying, and then injecting an electrolytic solution into the resulting structure and gelling the same at high temperature. Japanese Laid-open Patent Publication Hei 10-162802 discloses a separator prepared by coating or impregnating a polymeric gel electrolyte such as polyacrylonitrile into a porous insulating film.

Support bodies of a polymeric gel electrolyte that are comprised of a porous film typically are prepared by gelling the polymer that is coated on the porous film at high temperatures. This process is carried out primarily due to the poor compatibility between the polymer and the electrolytic solution, and because it improves the workability of the polymeric gel electrolyte. There still are safety problems due to leakage of the electrolytic solution. Further, since most polymers that are coated on the porous film are hydrophilic, they can be easily peeled off from the porous film, which usually is made of hydrophobic materials.

Japanese Laid-open Patent Publication Hei 11-313535 discloses a process of preparing lithium secondary batteries using polymeric gel electrolytes. The polymeric gel electrolytes are prepared by mixing polyvinyl idenefluoride with an electrolytic solution comprised of a lithium salt and an organic solvent to produce a mixture, coating an electrode with the mixture, and then heating. The lithium secondary batteries prepared in accordance with this process exhibit improved adhesion between the electrodes and the polymeric gel electrolyte, and they have a more uniform distribution of the electrolytic solution. If the polymeric gel electrolyte composition containing an organic electrolytic solution is previously coated on the electrode, however, the solvent contained in the composition may be volatile. Thus, an organic solvent having a high boiling point must be used as the organic solvent. In addition, low humidity conditions typically are required during the process of making the lithium secondary batteries.

Carbon, and in particular graphite, which usually is prepared through high-temperature annealing, generally is used the anode active material in lithium ion batteries or lithium polymer batteries. When using this anode active material, the charging/discharging potential curve sharply varies depending on the type of organic solvent employed in the electrolytic solution, thereby resulting in a great variation in the irreversible capacity and battery efficiency. In particular, employing propylene carbonate (a high boiling point solvent) as the organic solvent for the electrolyte solution used to prepare lithium ion batteries and lithium polymer batteries, produces a large irreversible capacity of the anode, and causes severe side reactions, such as gas generation. Thus, only a minimum amount of propylene carbonate typically is used or its use is limited. Accordingly, there is a crucial demand for development of high boiling point organic solvents that can replace propylene carbonate, or for developing new anode materials for use in lithium batteries that employ polymeric gel electrolytes.

The description herein of certain advantages and disadvantages encountered by previous systems is not intended to limit the present invention. Indeed, the present invention may include some or all of the features of previous systems without suffering from the same or similar disadvantages.

SUMMARY OF THE INVENTION

To solve the above-described and other problems, it is a feature of an embodiment of the present invention to provide a polymeric gel electrolyte having good mechanical properties, good adhesiveness to electrodes, and having good ionic conductivity. It is an additional feature of the invention to improve the desired ranges of the ingredients, and to improve the distribution thereof in an electrolytic solution. It is another feature of the present invention to provide a lithium battery that employs a gel electrolytic solution, whereby the battery has improved charging/discharging characteristics and efficiency, and has long lasting life and shelf characteristics.

To accomplish these and other features of various embodiments of the invention, there is provided a polymeric gel electrolyte including a first ionic conductive polymer having a weight-average molecular weight of greater than or equal to 5,000 and smaller than 100,000, a second ionic conductive polymer having a weight-average molecular weight of 100,000 to 5,000,000, and an electrolytic solution comprised of a lithium salt and an organic solvent.

In accordance with another feature of an embodiment of the invention, there is provided a method of making the polymeric gel electrolyte described above. In the method, the polymeric gel electrolyte preferably is obtained by dissolving the first and second ionic conductive polymers in a solvent, adding the electrolytic solution comprised of the lithium salt and the organic solvent thereto, mixing, and removing the solvent used in dissolving the first and second ionic conductive polymers.

In accordance with another feature of the present invention, there is provided a lithium battery including a cathode, an anode, a porous film interposed between the cathode and the anode, and a polymeric gel electrolyte. The polymeric gel electrolyte has a first ionic conductive polymer having a weight-average molecular weight of greater than or equal to 5,000 and smaller than 100,000, a second ionic conductive polymer having a weight-average molecular weight of 100,000 to 5,000,000, and an electrolytic solution comprised of a lithium salt and an organic solvent.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF PREFERRED EMBODIMENTS

Figure 1:
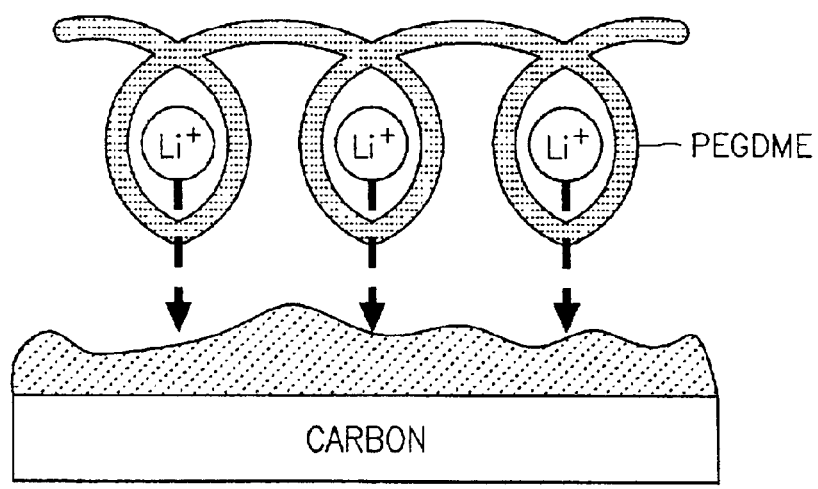
FIG. 1 is a representation illustrating an anode-polymeric electrolyte interface in a lithium battery according to the present invention.

This application claims priority to Korean priority application No. 2001-22674, filed on Apr. 26, 2002, the disclosure of which is incorporated by reference herein in its entirety.

The invention relates to a polymeric gel electrolyte including a first ionic conductive polymer having a weight-average molecular weight of between about 5,000 and about 100,000, a second ionic conductive polymer having a weight-average molecular weight of between about 100,000 and 5,000,000, and an electrolytic solution that includes a lithium salt and an organic solvent. It is preferred that the polymeric gel electrolyte be prepared by dissolving the first and second ionic conductive polymers in a solvent, adding the electrolytic solution comprised of the lithium salt and the organic solvent thereto, mixing, and removing the solvent used in dissolving the first and second ionic conductive polymers. The solvent used in dissolving the first and second ionic conductive polymers preferably is selected from acetone, tetrahydrofuran, dimethylformamide, dimethylsulfoxide, N-methylpyrrolidone, dimethylcarbonate, diethylcarbonate, and mixtures and combinations thereof.

The invention also relates to a lithium battery including a cathode, an anode, a porous film disposed between the cathode and the anode, and a polymeric gel electrolyte. The polymeric gel electrolyte has a first ionic conductive polymer having a weight-average molecular weight of between about 5,000 and about 100,000, a second ionic conductive polymer having a weight-average molecular weight of between about 100,000 and about, and an electrolytic solution comprised of a lithium salt and an organic solvent.

The first ionic conductive polymer preferably is selected from polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof. The second ionic conductive polymer preferably is selected from polyvinylidenefluoride, polyvinylidenefluoride-hexafluoropropylene copolymer, polyurethane, polyethylene oxide, polyacrylonitrile, polymethylmethacrylate, polyacrylamide, polyacetate, and mixtures and combinations thereof.

The present invention is characterized in that the first ionic conductive polymer has a weight-average molecular weight that preferably is greater than or equal to 5,000 and smaller than 100,000, and the second ionic conductive polymer has a weight-average molecular weight of 100,000 to 5,000,000. Both the first and second ionic conductive polymers are used as a polymer for forming a matrix of a polymeric electrolyte. The first ionic conductive polymer preferably is an ether-based resin or an ester-based resin that has good ionic conductivity and a very high capability of suppressing a side reaction from occurring at an electrode/electrolyte interface. The second ionic conductive polymer has good mechanical properties and has a good capability of impregnating an electrolytic solution.

If the weight-average molecular weight of the first ionic conductive polymer is greater than or equal to 100,000, the first ionic conductive polymer may not be uniformly impregnated into an electrode. If the weight-average molecular weight of the first ionic conductive polymer is smaller than 5,000, the mechanical properties of the polymer may become deteriorated. If the weight-average molecular weight of the second ionic conductive polymer is greater than 5,000,000, the capability of impregnating electrolytic solution and adhesion at the electrode/electrolyte interface can become poor. If the weight-average molecular weight of the second ionic conductive polymer is smaller than 100,000, the mechanical properties of the polymeric electrolyte may become deteriorated. Accordingly, it is preferred in the present invention to use two different ionic conductive polymers whereby the first ionic conductive polymer has a weight average molecular weight of greater than or equal to 5,000, but less than 100,000, and the second ionic conductive polymer has a weight average molecular weight of greater than 100,000 and less than or equal to 5,000,000.

Preferred examples of the first ionic conductive polymer include polyethyleneglycol dimethyl ether, polyethyleneglycol diethyl ether, polyethyleneglycol dimethacrylate, polyethyleneglycol diacrylate, polypropyleneglycol dimethacrylate, polypropyleneglycol diacrylate, and mixtures and combinations thereof. Preferred examples of the second ionic conductive polymer include a fluoride-based resin such as polyvinylidenefluoride or a vinylidenefluoride-hexafluoropropylene copolymer, polyurethane, polyethylene oxide, polyacrylonitrile, polymethylmethacrylate, polyacrylamide, polyacetate, and mixtures and combinations thereof.

The molecular weight distribution of polymer is determined by Gel Permeation Chromatography (GPC). Separation is accomplished on a column packed with a highly porous material such as rigid porous beads of silica, that separates the polymer molecules according to size. Molecular weights at a given retention volume are obtained by comparing the gel permeation chromatogram with a reference chromatogram, polystyrene in this case, obtained with fractions of known average molecular weight in the same solvent, N,N-dimethylformamide in this case, and at the same temperature.

A method of preparing a polymeric gel electrolyte according to the present invention will now be described. The first ionic conductive polymer and the second ionic conductive polymer preferably are first dissolved in a solvent and an electrolytic solution comprised of a lithium salt and an organic solvent then may be added thereto to obtain a composition for forming a polymeric electrolyte. Then, an electrode and/or a porous film preferably are coated with the composition and dried to remove the solvent used in dissolving the first and second ionic conductive polymers, thereby obtaining a polymeric gel electrolyte.

Any solvent can be used in the invention to dissolve the first and second ionic conductive polymer, so long as the solvent can dissolve the polymers, and subsequently be removed by drying. Examples of the solvent used in dissolving the first and second ionic conductive polymers include acetone, tetrahydrofuran, dimethylformamide, dimethylsulfoxide, dimethylcarbonate, diethylcarbonate, and mixtures and combinations thereof. The solvent preferably is used in an amount ranging from about 200 to about 2000 parts by weight, based on 100 parts by weight of the first and second ionic conductive polymers. Those skilled in the art are capable of using the appropriate amount of solvent(s) in view of the solubility of the first and second ionic conductive polymers. The total content of the first and second ionic conductive polymers in the polymeric gel electrolyte forming composition preferably is from about 1 to about 40 parts by weight, based on 100 parts by weight of the overall composition. If the total amount of the first and second ionic conductive polymers is less than bout 1 part by weight, it may be difficult to form a polymeric electrolyte having a good mechanical strength. On the other hand, if the total amount of the first and second ionic conductive polymers is greater than about 40 parts by weight, the ionic conductivity of a polymeric electrolyte may become sharply decreased.

The mixture ratio by weight of the first ionic conductive polymer to the second ionic conductive polymer preferably is within the range of from about 5:95 to about 50:50, and more preferably from about 20:80 to about 30:70. If the content of the second ionic conductive polymer relative to the content of the first ionic conductive polymer exceeds the above range, a side reaction may occur in a battery, thereby delimiting or eliminating the physical properties of the first ionic conductive polymer. On the other hand, if the content of the second ionic conductive polymer relative to the content of the first ionic conductive polymer is below the above range, the composition may become undesirably brittle in view of its mechanical properties. The amount of the electrolytic solution in the polymeric electrolyte forming composition preferably is from about 60 to about 99 parts by weight, based on 100 parts by weight of the composition.

To make the polymeric gel electrolyte, the polymeric electrolyte forming composition preferably is coated on an electrode and/or porous film, and dried at a predetermined temperature, preferably in the temperature range of from 25 to 90° C. If the drying temperature is lower than 25° C., it may take too long to dry the composition and remove the solvent used to dissolve the first and second ionic conductive polymers. If the drying temperature is higher than 90° C., the electrolytic solution may be excessively volatilized, and the lithium salt may be decomposed. Using the guidelines provided herein, those skilled in the art are capable of selecting a suitable solvent to dissolve the first and second ionic polymers.

Any lithium salt may be used in the electrolytic solution so long as it forms an effective polymeric gel electrolyte. The lithium salt used in the electrolytic solution preferably is selected from $LiClO_4$, $LiBF_4$, $LiPF_6$, $LiCF_3SO_3$, $LiN(CF_3SO_2)_2$ and mixtures and combinations thereof.

Any organic solvent can be used to form the electrolytic solution so long as it forms an effective polymeric gel electrolyte. Suitable organic solvents include propylene carbonate, ethylene carbonate, diethylcarbonate, dimethylcarbonate, ethylmethylcarbonate, dipropylcarbonate, dimethylsuloxide, acetonitrile, dimethoxyethane, diethoxyethane, vinylene carbonate, y-butyrolactone, ethylene sulfite, propylene sulfite, tetrahydrofuran, and mixtures and combinations thereof. The concentration of the lithium salt in the electrolytic solution preferably is within the range of from about 0.5 to about 2 M. If the concentration of the lithium salt exceeds the above range, the ionic conductivity of the polymeric electrolyte may be deteriorated, adversely affecting battery performance.

Since the polymeric electrolyte forming composition coated on the electrode and/or porous film is subjected to the drying step, the organic solvent in the electrolytic solution preferably is a solvent that will not be removed during the drying step. That is, it is preferred to use a high boiling point organic solvent such as ethylene carbonate, propylene carbonate or Y-butyrolactone so that the solvent is not removed during drying. Using the guidelines provided herein, those skilled in the art are capable of selecting a suitable solvent for use in the electrolytic solution, such that the solvent will not be removed during drying.

When high-crystalline carbon materials, such as carbon or graphite, are used as the anode active materials, these materials may react with an electrolytic solution containing a high boiling point solvent to cause an undesired irreversible chemical reaction in addition to charging and discharging of the lithium. This will now be more fully described by way of example of electrolytic solution decomposition between the high-crystalline carbon material and a high boiling point solvent such as propylene carbonate.

When propylene carbonate is used as the organic solvent in the electrolytic solution, propylene carbonate may become decomposed due to a reaction between propylene carbonate and the anode active material. This decomposition can produce gases such as carbon dioxide or propylene, resulting in deterioration of the battery. In the present invention, in order to overcome this problem, it is preferred to add to the electrolytic solution and/or anode at least component selected from polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof.

In a lithium battery according to a preferred embodiment of the present invention in which polyethyleneglycol dimethylether (PEGDME) is added to the electrolytic solution or anode, the state of anode/polymeric electrolyte interface can be described with reference to FIG. 1. As shown in FIG. 1, PEGDME surrounds the lithium ion ($Li^+$) instead of propylene carbonate, which typically is used as an organic solvent of an electrolytic solution. The effect of surrounding the lithium is to suppress a direct chemical reaction between the carbon anode, and propylene carbonate, thereby maximally suppressing any gas generation reaction and/or other irreversible reactions.

As described above, when at least one polymer selected from polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, is added to the electrolytic solution and/or anode, the preferred content of the polymer is in the range of from about 0.1 to about 10 parts by weight, more preferably in the range of from about 1 to about 5 parts by weight, based on 100 parts by weight of the anode active material such as carbon. If the content of the polymer falls short of this range, the effect of suppressing a direct reaction between carbon and propylene carbonate may become negligible. On the other hand, if the content of the polymer exceeds this range, the electrode/electrolyte interface resistance undesirably increases.

Now, a method of preparing a lithium battery employing a polymeric gel electrolyte according to the present invention will be described. First, a cathode and an anode are manufactured by forming an electrode active material layer on a current collector using electrode active material compositions each preferably containing an electrode active material, a binder, a conductive agent and a solvent. Those skilled in the art are capable of forming cathodes and anodes in this manner. In some cases, the electrode active material composition may further include a plasticizer. A foil expanded metal or punched metal can be used as the current collector. The method of forming the electrode active material layer includes a process of directly coating an electrode active material composition on a current collector, and a process of coating an electrode active material composition on a separate support body, drying and laminating a film released from the support body on a current collector. Any material that can support the active material layer may be used as the support body. Suitable examples thereof include mylar film or polyethyleneterephthalate (PET) film.

In the present invention, a lithium composite oxide, such as $LiCoO_2$, preferably is used as the electrode active material for the cathode, and carbon or graphite preferably is used as the electrode active material for an anode. Skilled artisans will be capable of utilizing other suitable materials for the cathode and anode active material, using the guidelines provided herein. Carbon black or acetylene black preferably is used as the conductive agent. Here, the content of the conductive agent preferably is within the range of from about 1 to about 20 parts by weight, based on 100 parts by weight of the electrode active material, e.g., $LiCoO_2$. If the content of the conductive agent is less than 1 part by weight, the effect of improving conductivity between the electrode active material layer and the current collector may become negligible. If the content of the conductive agent is greater than 20 parts by weight, the relative content of the electrode active material may be undesirably reduced.

Any suitable binder can be used in the invention. Preferred binders are selected from vinylidenefluoride-hexafluoropropylene (VdF/HFP) copolymer, polyvinylidenefluoride, polyacrylonitrile, polymethylmethacrylate, and mixtures and combinations thereof. The amount of binder utilized preferably is within the range of from about 1 to about 30 parts by weight, based on 100 parts by weight of the electrode active material. When the content of the binder is within the range, the adhesion between the current collector and the electrode active material layer is good.

Any solvent typically used in conventional lithium secondary batteries can be used as the solvent in the present invention. Particularly preferred solvents include acetone and N-methylpyrrolidone.

After the cathode and the anode are prepared as described above, the polymeric electrolyte forming composition then preferably is coated on the electrode and/or porous film, and dried at a predetermined temperature, preferably in the temperature range of from 25 to 90° C. The polymeric electrolyte forming composition preferably is prepared as described in more detail earlier. In the case where the polymeric electrolyte forming composition is coated on the electrode, it can be absorbed into pores in the electrode and may exist in the pores in a gel state after the drying step.

The porous film used in the present invention preferably is an insulating resin sheet having a network structure, and preferably is made of at least one resin selected from an olefin-based resin such as polyethylene or polypropylene, a fluoride-based resin such as polyvinylidenefluoride or polytetrafluoroethylene, an ester-based resin such as polyethyleneterephthalate, cellulose, and mixtures and combinations thereof. The thickness of the porous film preferably is within the range of from about 5 to about 30 μm, and the porosity thereof preferably is within the range of from about 10 to about 50%. The thickness of the polymeric gel electrolyte preferably is within the range of from about 1 to about 30 μm.

A winding-type electrode assembly based on a jelly-roll method or a bi-cell electrode assembly can be fabricated using the thus prepared electrode, porous film and polymeric electrolyte. Skilled artisans are capable of fabricating such assemblies, using the guidelines provided herein. The thus fabricated electrode assembly then preferably is disposed in a battery case, and hermetically sealed, thereby completing the lithium battery according to the present invention. The lithium battery according to the present invention is not specifically limited from the viewpoint of type or shape, and the present invention can be applied to both lithium primary batteries and lithium secondary batteries such as lithium polymer batteries or lithium ion batteries.

As described above, since the polymeric gel electrolyte according to the present invention preferably is prepared by coating an electrode and/or porous film with a polymeric electrolyte forming composition and drying, it is quite easy to adjust the distribution and content of the electrolytic solution. In addition, any interface resistance between the electrode and/or porous film and the polymeric electrolyte can be minimized in the present invention. Moreover, the manufacturing process can be simplified and the manufacturing cost can be reduced because subsequent injection of an electrolytic solution is not required. In particular, the characteristics of a lithium polymer battery can be maximally enhanced by adjusting the kind and molecular weight of a polymer for a polymeric electrolyte according to the electrode and/or porous film used in the battery, or by adjusting the viscosity of a polymeric electrolyte forming composition. Thus, the polymeric gel electrolyte according to the present invention has a variety of applications.

The present invention also is capable of suppressing a direct chemical reaction between carbon and an organic solvent such as propylene carbonate, by adding a polymer such as polyethyleneglycol dimethylether to the electrolytic solution and/or anode. Thus, even a high boiling point organic solvent that typically causes a severe side reaction with carbon can be used as the organic solvent of the electrolytic solution. Accordingly, the process of forming a polymeric electrolyte can be more simplified and charging/discharging characteristics, efficiency and cycle performance of a battery can be improved.

The present invention now will be described through the following non-limiting examples.

EXAMPLE 1

Approximately 94 g of $LiCoO_2$, 3 g of carbon black, and 3 g of polyvinylidenefluoride were dissolved and dispersed in 80 g of N-methylpyrrolidone to prepare a cathode active material slurry. The cathode active material slurry was coated on an aluminum foil using a coating device, dried and pressed using a roll press to form a cathode.

About 90 g of mesocarbonmicrobead (MCMB), 10 g of polyvinylidenefluoride were dissolved and dispersed in 80 g of N-methylpyrrolidone to prepare an anode active material slurry. The anode active material slurry was coated on a copper foil using a coating device, dried and pressed using a roll press to prepare an anode.

Separately, 10 g of a vinylidenefluoride-hexafluoropropylene copolymer having a weight-average molecular weight of 1,000,000 and 10 g of polyethyleneglycol dimethylether having a weight-average molecular weight of 20,000 were dissolved in 200 g of dimethyl carbonate, mixed with 90 g of an electrolytic solution obtained by dissolving 0.8 M $LiPF_6$ in a solvent of ethylene carbonate and propylene carbonate in the mixture ratio by weight of 50:50, to produce a polymeric electrolyte forming composition.

The polymeric electrolyte forming composition was coated on the cathode and the anode, dried at 50° C. to form an polymeric electrolyte in the pores of and on the surface of the electrodes. Then, a polyethylene sheet is interposed between the cathode and anode coated with the polymeric electrolyte. The resultant structure was wrapped to complete a lithium polymer battery.

EXAMPLE 2

A polymeric electrolyte and a lithium polymer battery were prepared in the same manner as in Example 1, except for using polyethyleneglycol dimethylether having a weight-average molecular weight of 50,000 in preparing a polymeric electrolyte forming composition.

EXAMPLE 3

A cathode and an anode were first prepared in the same manner as in Example 1. Also, a polymeric electrolyte forming composition was prepared in the same manner as in Example 1, and was then coated on a polyethylene sheet and dried to form a polymeric electrolyte. The cathode and the anode were stacked with the polyethylene sheet/polymeric electrolyte structure interposed therebetween, and the resultant structure was wrapped to complete a lithium polymer battery.

EXAMPLE 4

A cathode and an anode were first prepared in the same manner as in Example 1. Also, a polymeric electrolyte forming composition was prepared by dissolving 15 g of polyethylene oxide having a weight-average molecular weight of 500,000 and 5 g of polyethyleneglycol dimethylether having a weight-average molecular weight of 80,000 in 200 g of dimethyl carbonate and mixing the same with 80 g of an electrolytic solution obtained by dissolving 1.1 M $LiPF_6$ in a solvent of ethylene carbonate and propylene carbonate having a ratio by weight of 50:50.

The polymeric electrolyte forming composition was coated on the cathode and the anode, dried at 60° C. to form a polymeric electrolyte in the pores of and on the surface of the electrodes. Then, the cathode and anode coated with polymeric electrolyte were stacked with a polyethylene sheet interposed therebetween, and the resultant structure was wrapped, thereby completing a lithium polymer battery.

EXAMPLES 5–8

Lithium polymer batteries were prepared in the same manners as in Examples 1–4, except that the anode was prepared in the following manner.

Polyvinylidenfluoride (12 g) and 2 g of polyethyleneglycol dimethylether having a weight-average molecular weight of 50,000 were dissolved in 70 g of N-methylpyrrolidone, and then 86 g of graphite-based carbon was added thereto and sufficiently dispersed to prepare an anode active material slurry. The anode active material slurry was coated on a copper foil, dried at room temperature and vacuum-dried at about 130° C. for about 5 hours. The resultant structure was compressed using a roll press, thereby preparing an anode.

EXAMPLES 9–10

Polymeric electrolytes and lithium polymer batteries were prepared in the same manner as in Example 1, except that polyethyleneglycol diacrylate (Ex. 9) and polypropyleneglycol dimethacrylate (Ex. 10), respectively, were used instead of polyethyleneglycol dimethylether in preparing the polymeric electrolyte forming composition.

EXAMPLES 11–15

Polymeric electrolytes and lithium polymer batteries were prepared in the same manner as in Example 1, except polyurethane, polyethylene oxide, polyacrylonitrile, polymethylmethacrylate, polyacrylamide and polyacetate, respectively, were used instead of the vinylidenefluoride-hexafluoropropylene copolymer in preparing the polymeric electrolyte forming composition.

COMPARATIVE EXAMPLE 1

A lithium polymer battery was prepared in the same manner as in Example 1, except that 10 g of polyethyleneglycol dimethylether were not added in preparing the polymeric electrolyte forming composition.

COMPARATIVE EXAMPLE 2

A lithium polymer battery was prepared in the same manner as in Example 1, except that polyethyleneglycol dimethylether having a weight-average molecular weight of 250,000 was used in preparing the polymeric electrolyte forming composition.

COMPARATIVE EXAMPLE 3

A lithium polymer battery was prepared in the same manner as in Example 1, except that 10 g of vinylidenefluoride-hexafluoropropylene copolymer was not added in preparing the polymeric electrolyte forming composition.

COMPARATIVE EXAMPLE 4

A lithium polymer battery was prepared in the same manner as in Example 1, except that polyethyleneglycol dimethylether having a weight-average molecular weight of 2,000 was used in preparing the polymeric electrolyte forming composition.

COMPARATIVE EXAMPLE 5

A lithium polymer battery was prepared in the same manner as in Example 1, except that vinylidenefluoride-hexafluoropropylene copolymer having a weight-average molecular weight of 10,000 was used in preparing the polymeric electrolyte forming composition.

COMPARATIVE EXAMPLE 6

A lithium polymer battery was prepared in the same manner as in Example 1, except that vinylidenefluoride-hexafluoropropylene copolymer having a weight-average molecular weight of 10,000,000 was used in preparing the polymeric electrolyte forming composition.

The polymeric electrolyte forming compositions according to Examples 1–15 were coated between two stainless steel electrodes and dried and then subjected to evaluation of ionic conductivity and electrochemical stability. The ionic conductivity of a polymeric electrolyte was measured by an AC impedance method, and the electrochemical stability thereof was measured by linear scanning potentiometry. In accordance with this method, oxidizing decomposition potentials were obtained from a change in current depending on a voltage applied to metallic lithium foils used as a counter electrode, and a standard electrode and a platinum electrode used as a working electrode.

Figure 2:
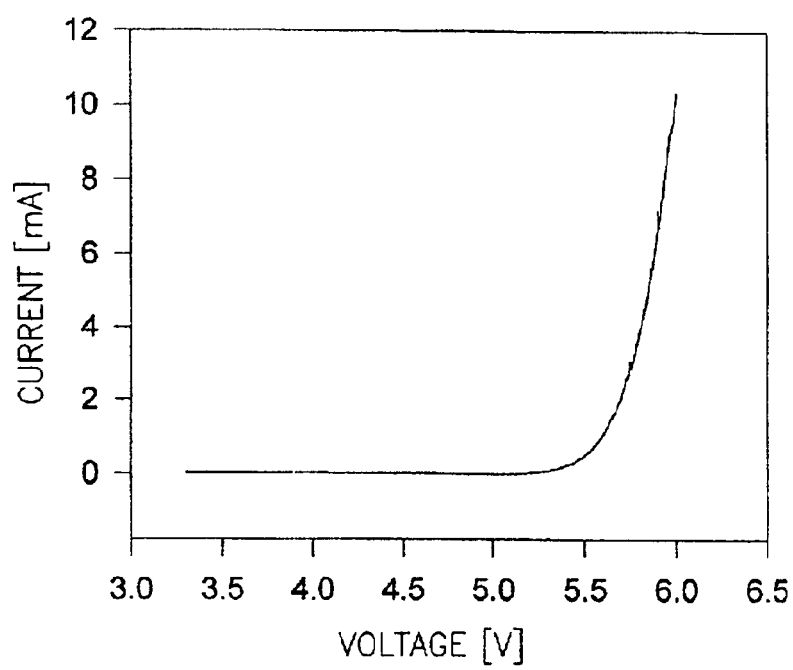
FIG. 2 is a voltamogram of a polymeric electrolyte according to Example 1 of the present invention, on the basis of linear scanning potentiometry.

The evaluation results showed that the ionic conductivity of the polymeric electrolyte prepared in Example 1 was $1.9 \times 10^{-3}$ S/cm and little change in the ionic conductivity was observed over time, meaning that injection of an electrolytic solution did not result in an increase in the resistance. As shown in FIG. 2, it was confirmed that the polymeric electrolyte was electrochemically stable up to 5.5 V on the basis of lithium metal. The evaluation results also revealed that the ionic conductivities of the polymeric electrolytes prepared in Examples 2–15 were substantially the same as the ionic conductivity of the polymeric electrolyte prepared in Example 1.

Figure 3:
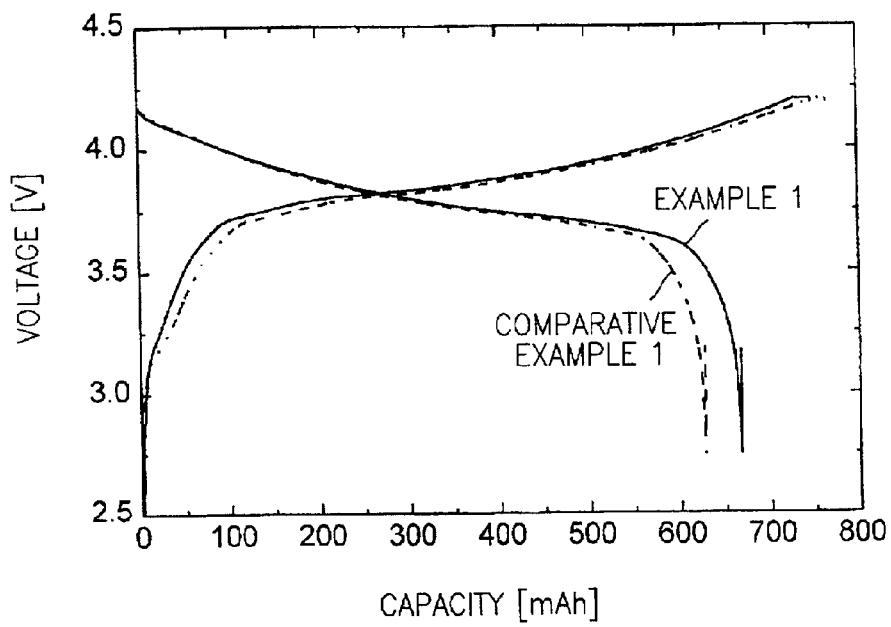
FIG. 3 is a graph showing charge/discharge characteristics of lithium polymer batteries according to Example 1 of the present invention and Comparative Example 1.

A change in the capacity for the lithium polymer batteries prepared in Example 1 and Comparative Example 1 was investigated after repeated cycles of charging and discharging under the current rate condition of 0.1 C, and the results are shown in FIG. 3. Referring now to FIG. 3, the lithium polymer battery prepared in Example 1 had better discharge capacity characteristics than the lithium polymer battery prepared in Comparative Example 1, and it had a smaller charge capacity relative to the discharge capacity, which means a reduction in occurrence of irreversible reaction. It therefore can be confirmed that the lithium polymer battery prepared in Example 1 has better charging/discharging efficiencies than the lithium polymer battery prepared in Comparative Example 1.

Figure 4:
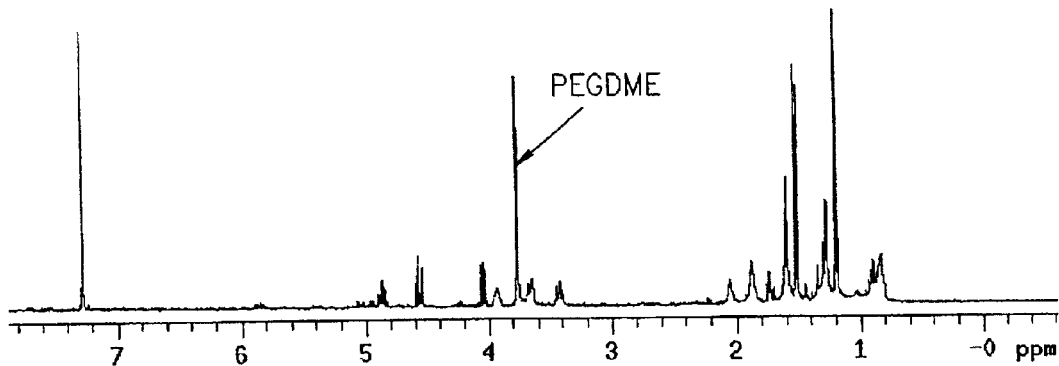
FIG. 4 is a graph showing a $^1$H-NMR spectrum of a polymer extracted from an anode according to Example 2 of the present invention.
Figure 5:
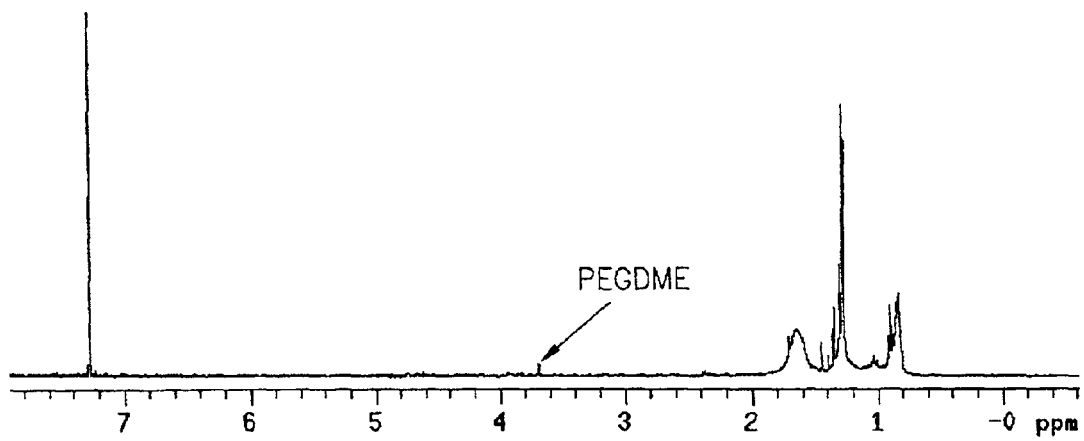
FIG. 5 is a graph showing a $^1$H-NMR spectrum of a polymer extracted from an anode according to Comparative Example 2.

The polymeric electrolytes prepared in Example 2 and Comparative Example 2, were removed from the anodes and then the polymers included in the anodes were extracted. These polymers then were subjected to $^1$H-NMR spectrum measurement, and the results thereof are shown in FIGS. 4 and 5. The polymers were extracted from the anodes by performing a sonication extraction technique at about 60° C. for 30 minutes using dimethylformamide (DMF).

Referring now to FIGS. 4 and 5, it can be seen that polyethyleneglycol dimethylether was not impregnated into the anode prepared in Comparative Example 2, whereas polyethyleneglycol dimethylether was present in the anode prepared in Example 2. These results confirm that battery characteristics are importantly influenced by the weight-average molecular weight range of polyethyleneglycol dimethylether added to the anode. That is to say, if the weight-average molecular weight of a first ionic conductive polymer exceeds the maximum level of the weight-average molecular weight, the first ionic conductive polymer is not uniformly impregnated into an electrode but exists only on the surface of the anode, which deteriorates the ionic conductivity and performance of a battery.

Figure 6:
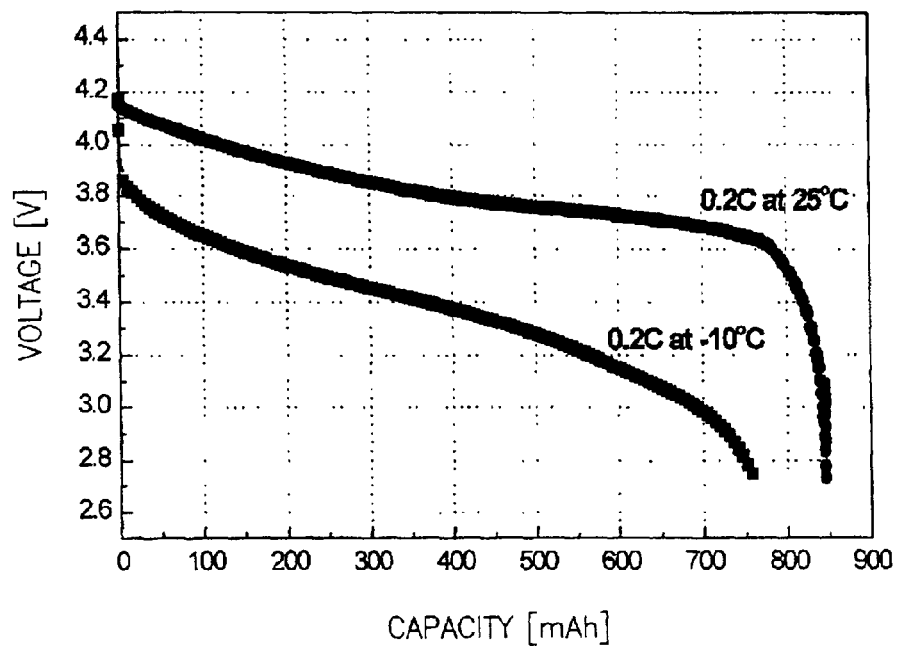
FIG. 6 is a representation of a discharge curve of a lithium polymer battery according to Example 3 of the present invention, showing a change in the capacity, obtained by repeated charging and discharging cycles at 25° C. and −10° C. under the current rate condition of 0.2 C.

A change in the capacity for the lithium polymer battery prepared in Example 3 was investigated after repeated cycles of charging and discharging at 25° C. and −10° C. under the current rate condition of 0.2 C, and the results thereof are shown in FIG. 6. As shown in FIG. 6, in the lithium polymer battery prepared in Example 3, the discharge capacity at −10° C. was over 90% relative to the discharge capacity at room temperature, which is a very high level in view of the ionic conductivity of the polymeric electrolyte compared to that of a liquid electrolyte at lower temperature. It thus can be confirmed that the lithium polymer battery prepared in Example 3 has good discharge capacity characteristics at room temperature and at lower temperature.

Figure 7:
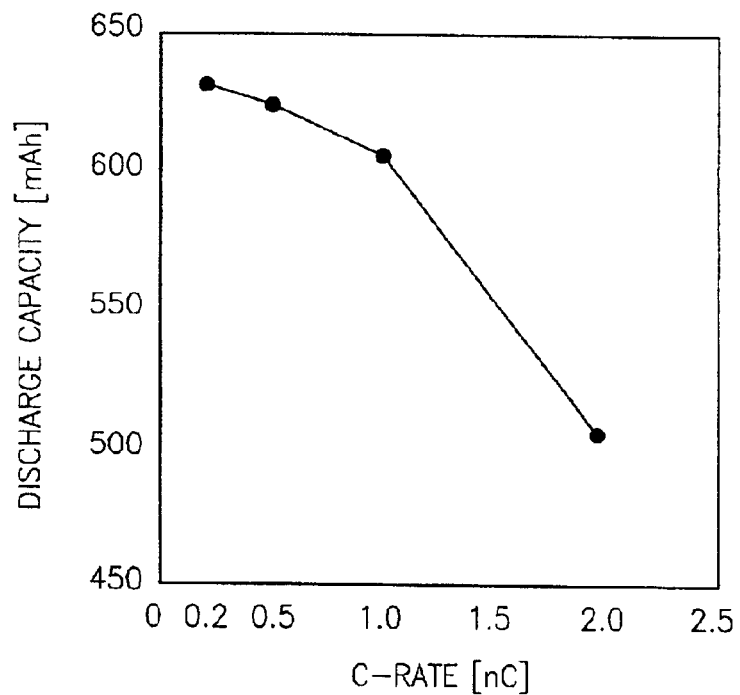
FIG. 7 is a representation of a discharge curve of a lithium polymer battery according to Example 4 of the present invention, showing a change in the capacity, obtained by repeated charging and discharging cycles under the different current rate conditions of 0.2 C, 0.5 C, 1.0 C and 2.0 C.

A change in the capacity for the lithium polymer battery prepared in Example 4 was investigated after repeated cycles of charging and discharging under the current rate conditions of 0.2, 0.5, 1 and 2 C, and the results thereof are shown in FIG. 7. As shown in FIG. 7, in the lithium polymer battery prepared in Example 4, the capacity under the current rate condition of 2 C was over 80% relative to that under the current rate condition of 0.2 C, which is an excellent high-rate capacity characteristic.

The life and shelf characteristics of the lithium polymer batteries prepared in Examples 1–15 and Comparative Examples 1–6 were evaluated. The life characteristic was evaluated by investigating a change in the discharge capacity relative to initial capacity after performing 100 cycles of charging and discharging at 1 C. The high-temperature shelf characteristic of a battery was evaluated by observing the appearance of the battery and measuring an oven circuit voltage (OCV) after letting a charged battery sit on a shelf at 85° C. for 5 days. The evaluation results showed that the life and shelf characteristics of the lithium polymer batteries prepared by Examples 1 through 15 were improved when compared to the lithium polymer batteries prepared by Comparative Examples 1–6.

Figure 8:
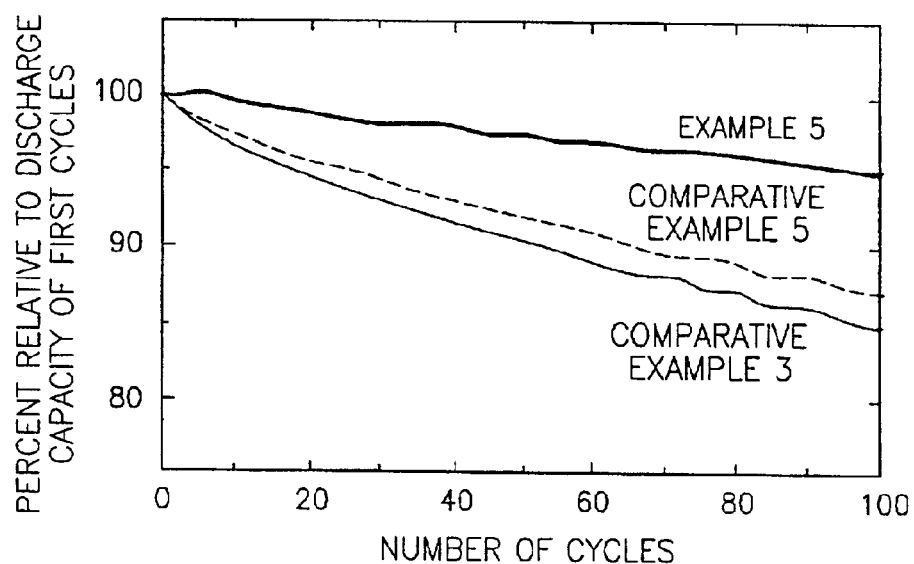
FIG. 8 is a representation of a change in the discharge capacity of lithium polymer batteries according to Example 5 of the present invention and Comparative Examples 3 and 5, obtained by repeated charging and discharging cycles under the current rate condition of 1 C.

FIG. 8 illustrates a change in the discharge capacity of lithium polymer batteries according to Example 5 of the present invention and Comparative Examples 3 and 5. The discharge capacity was obtained by repeated charging and discharging cycles under the current rate condition of 1 C. Referring now to FIG. 8, after 100 cycles of charging and discharging at the 1 C rate, the discharge capacity of the lithium polymer battery prepared in Example 5 was over 95% relative to the initial discharge capacity, whereas the lithium polymer batteries employing polymeric electrolytes comprised of the first ionic conductive polymer only (Comparative Example 3) and the second ionic conductive polymer only (Comparative Example 5) exhibited less than 90% relative the initial discharge capacity. These results indicate that the weight-average molecular weight, and the type and amount of a polymer can greatly affect the physical properties of a polymeric electrolyte, that is, life characteristics of a battery.

In particular, in the case of adding polyethyleneglycol dimethylether to an anode, (e.g., Examples 5–8), the batteries showed a thickness increase of 5% or less of their initial thicknesses, when they were allowed to stand at 85° C. for 4 days. In contrast, the lithium polymer battery prepared in Comparative Example 4 showed a thickness increase of above 20%. This implies that polyethyleneglycol dimethylether can suppress gas generation due to decomposition of an electrolytic solution, in particular, propylene carbonate, thereby improving the high temperature shelf characteristics.

Adhesion between electrodes and polymeric electrolyte was evaluated by performing peeling tests on the lithium polymer batteries prepared in Examples 1–15 and Comparative Examples 1–6. The evaluation results showed that the lithium polymer batteries prepared in Examples 1–15 had better adhesion than those prepared in Comparative Examples 1–6.

The polymeric gel electrolyte according to the present invention has an excellent capability of impregnating an electrolytic solution, and its addition to the electrolytic solution can prevent deterioration of its physical properties and improves ionic conductivity and adhesion to electrodes. The use of the polymeric gel electrolyte improves charging/discharging characteristics and efficiency of a lithium batter, as well as the life and shelf characteristics of a battery.

Although the present invention has been described with reference to the preferred examples, the foregoing disclosure should be interpreted as illustrative only and it should be understood that various modifications and variations can be easily made by those skilled in the art without departing from the spirit of the invention. Accordingly, the true scope and spirit of the invention should be defined by the following claims.

What is claimed is:

1. A polymeric gel electrolyte, comprising:
   a first ionic conductive polymer having a weight-average molecular weight of greater than or equal to 5,000 and smaller than 100,000;
   a second ionic conductive polymer having a weight-average molecular weight of 100,000 to 5,000,000; and
   an electrolytic solution comprised of a lithium salt, an organic solvent, and a component surrounding the lithium,
   wherein the component is selected from the group consisting of polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, wherein the content of the component in the electrolytic solution is within the range of from about 1 to about 40 parts by weight, based on 100 parts by weight of the electrolytic solution.

2. The polymeric gel electrolyte according to claim 1, wherein the first ionic conductive polymer is at least one polymer selected from the group consisting of polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, and the second ionic conductive polymer is at least one polymer selected from the group consisting of polyvinylidenefluoride, polyvinylidenefluoride-hexafluoropropylene copolymer, polyurethane, polyethylene oxide, polyacrylonitrile, polymethylmethacrylate, polyacrylamide, polyacetate, and mixtures and combinations thereof.

3. The polymeric gel electrolyte according to claim 1, wherein the polymeric gel electrolyte is obtained by dissolving the first and second ionic conductive polymers in a solvent, adding an electrolytic solution comprised of a lithium salt and an organic solvent thereto, mixing, and removing the solvent used in dissolving the first and second ionic conductive polymers.

4. The polymeric gel electrolyte according to claim 1, wherein the mixture ratio by weight of the first ionic conductive polymer to the second ionic conductive polymer is from about 5:95 to about 50:50.

5. The polymeric gel electrolyte according to claim 1, wherein the lithium salt in the electrolytic solution is at least one lithium salt selected from the group consisting of $LiClO_4$, $LiBF_4$, $LiPF_6$, $LiCF_3SO_3$, $LiN(CF_3SO_2)_2$, and mixtures and combinations thereof, and wherein the organic solvent is at least one solvent selected from the group consisting of propylene carbonate, ethylene carbonate, diethylcarbonate, dimethylcarbonate, ethylmethylcarbonate, dipropylcarbonate, dimethylsulfoxide, acetonitrile, dimethoxyethane, diethoxyethane, vinylene carbonate, γ-butyrolactone, ethylene sulfite, propylene sulfite, tetrahydrofuran, and mixtures and combinations thereof.

6. The polymeric gel electrolyte according to claim 1, wherein the amount of the electrolytic solution is within the range of from about 100 to about 10,000 parts by weight, based on 100 parts by weight of the first and second ionic conductive polymers, and wherein the concentration of the lithium salt in the electrolytic solution is within the range of from about 0.5 to about 2 Molar.

7. A lithium battery, comprising:
a cathode;
an anode;
a porous film interposed between the cathode and the anode; and
a polymeric gel electrolyte comprised of a first ionic conductive polymer having a weight-average molecular weight of greater than or equal to 5,000 and smaller than 100,000, a second ionic conductive polymer having a weight-average molecular weight of 100,000 to 5,000,000, and an electrolytic solution comprised of a lithium salt and an organic solvent, at least one of the anode and the electrolytic solution including
at least one polymer selected from the group consisting of polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, wherein the content of the polymer in the electrolytic solution is within the range of from about 1 to about 40 parts by weight, based on 100 parts by weight of the electrolytic solution, and wherein the amount of the polymer in the anode is within the range of from about 0.1 to about 10 parts by weight based on 100 parts by weight of an anode active material.

8. The lithium battery according to claim 7, wherein the first ionic conductive polymer is at least one polymer selected from the group consisting of polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, and wherein the second ionic conductive polymer is at least one polymer selected from the group consisting of polyvinylidenefluoride, polyvinylidenefluoride-hexafluoropropylene copolymer, polyurethane, polyethylene oxide, polyacrylonitrile, polymethylmethacrylate, polyacrylamide, polyacetate, and mixtures and combinations thereof.

9. The lithium battery according to claim 7, wherein the polymeric gel electrolyte is obtained by coating at least one surface of a porous film and an electrode with a composition prepared by dissolving the first and second ionic conductive polymers in a solvent, adding the electrolytic solution comprised of a lithium salt and an organic solvent thereto and mixing, and drying.

10. The lithium battery according to claim 7, wherein the mixture ratio by weight of the first ionic conductive polymer to the second ionic conductive polymer is from about 5:95 to about 50:50.

11. The lithium battery according to claim 7, wherein the lithium salt in the electrolytic solution is at least one lithium salt selected from the group consisting of $LiClO_4$, $LiBF_4$, $LiPF_6$, $LiCF_3SO_3$, $LiN(CF_3SO_2)_2$, and mixtures and combinations thereof, and wherein the organic solvent is at least one solvent selected from the group consisting of propylene carbonate, ethylene carbonate, diethylcarbonate, dimethylcarbonate, ethylmethylcarbonate, dipropylcarbonate, dimethylsulfoxide, acetonitrile, dimethoxyethane, diethoxyethane, vinylene carbonate, γ-butyrolactone, ethylene sulfite, propylene sulfite, tetrahydrofuran, and mixtures and combinations thereof.

12. The lithium battery according to claim 7, wherein the porous film is comprised of at least one material selected from the group consisting of polyethylene, polypropylene, polyvinylidenefluoride, polytetrafluoroethylene, polyethyleneterephthalate, cellulose, and mixtures and combinations thereof.

13. The lithium battery according to claim 7, wherein the amount of the electrolytic solution of the polymeric gel electrolyte is within the range of from about 100 to about 10,000 parts by weight, based on 100 parts by weight of the first and second ionic conductive polymers, and wherein the concentration of the lithium salt in the electrolytic solution is within the range of from about 0.5 to about 2 M.

14. A method of making a polymeric gel electrolyte, comprising:
forming a solution by dissolving a first ionic conductive polymer having a weight-average molecular weight of greater than or equal to 5,000 and smaller than 100,000, and a second ionic conductive polymer having a weight-average molecular weight of 100,000 to 5,000,000 in a solvent;
adding to the solution prepared above an electrolytic solution comprised of a lithium salt and an organic solvent thereto;
mixing the resulting solution; and
removing the solvent used in dissolving the first and second ionic conductive polymers,
wherein the electrolytic solution includes at least one polymer selected from the group consisting of polyethyleneglycol dimethylether, polyethyleneglycol diethylether, polyethyleneglycol dimethacrylate, polyethyleneglycol diacrylate, polypropyleneglycol dimethacrylate, polypropyleneglycol diacrylate, and mixtures and combinations thereof, wherein the content of the polymer in the electrolytic solution is within the range of from about 1 to about 40 parts by weight, based on 100 parts by weight of the electrolytic solution.

15. The method according to claim 14, wherein the solvent used in dissolving the first and second ionic conductive polymers is at least one solvent selected from the group consisting of acetone, tetrahydrofuran, dimethylformamide, dimethylsulfoxide, N-methylpyrrolidone, dimethylcarbonate, diethylcarbonate, and mixtures and combinations thereof.

16. The method according to claim 14, wherein the solvent is removed by drying at a temperature within the range of from about 25 to about 90°C.

17. The method according to claim 14, wherein the mixture ratio by weight of the first ionic conductive polymer to the second ionic conductive polymer is from about 5:95 to about 50:50.

18. The method according to claim 14, further comprising, after the mixing and before the removing, coating at least one of an electrode and a porous film with the resulting solution.

19. A polymeric gel electrolyte, comprising:
a first ionic conductive polymer having a weight-average molecular weight of greater than or equal to 5,000 and smaller than 100,000;

a second ionic conductive polymer having a weight-average molecular weight of 100,000 to 5,000,000; and an electrolytic solution comprised of a lithium salt and an organic solvent, wherein the first ionic conductive polymer is at least one polymer selected from the group consisting of polyethyleneglycol dimethylether and polyethyleneglycol diethylether, and the second ionic conductive polymer is at least one polymer selected from the group consisting of polyvinylidenefluoride, polyvinylidenefluoride-hexafluoropropylene copolymer, polyurethane, polyethylene oxide, polyacrylonitrile, polymethylmethacrylate, polyacrylamide, and polyacetate.

20. A lithium battery, comprising:

a cathode;

an anode;

a porous film interposed between the cathode and the anode; and a polymeric gel electrolyte comprised of a first ionic conductive polymer having a weight-average molecular weight of greater than or equal to 5,000 and smaller than 100,000, a second ionic conductive polymer having a weight-average molecular weight of 100,000 to 5,000,000, and an electrolytic solution comprised of a lithium salt and an organic solvent, wherein the first ionic conductive polymer is at least one polymer selected from the group consisting of polyethyleneglycol dimethylether and polyethyleneglycol diethylether, and the second ionic conductive polymer is at least one polymer selected from the group consisting of polyvinylidenefluoride, polyvinylidenefluoride-hexafluoropropylene copolymer, polyurethane, polyethylene oxide, polyacrylonitrile, polymethylmethacrylate, polyacrylamide, and polyacetate.

* * * * *